May 28, 1946. W. W. LAUGHLIN 2,401,255
COLLAPSIBLE WHEEL ALIGNING GAUGE
Filed Feb. 2, 1945
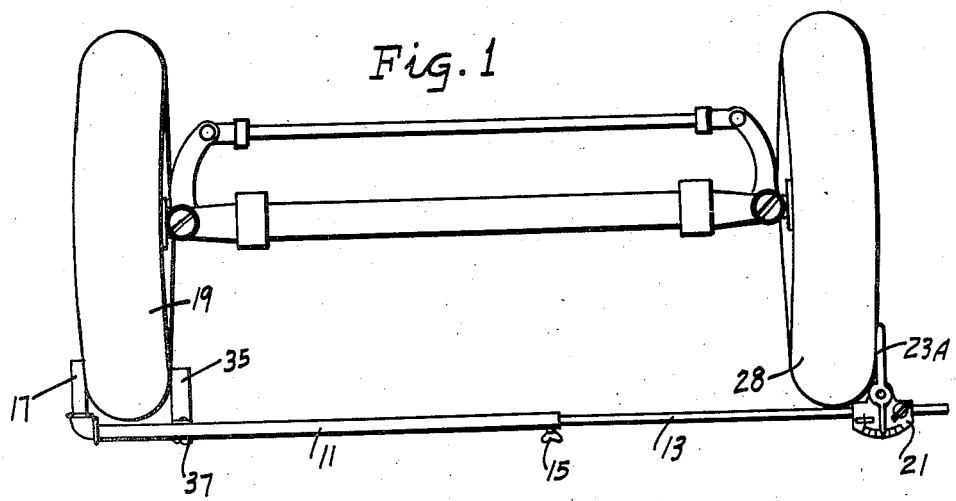
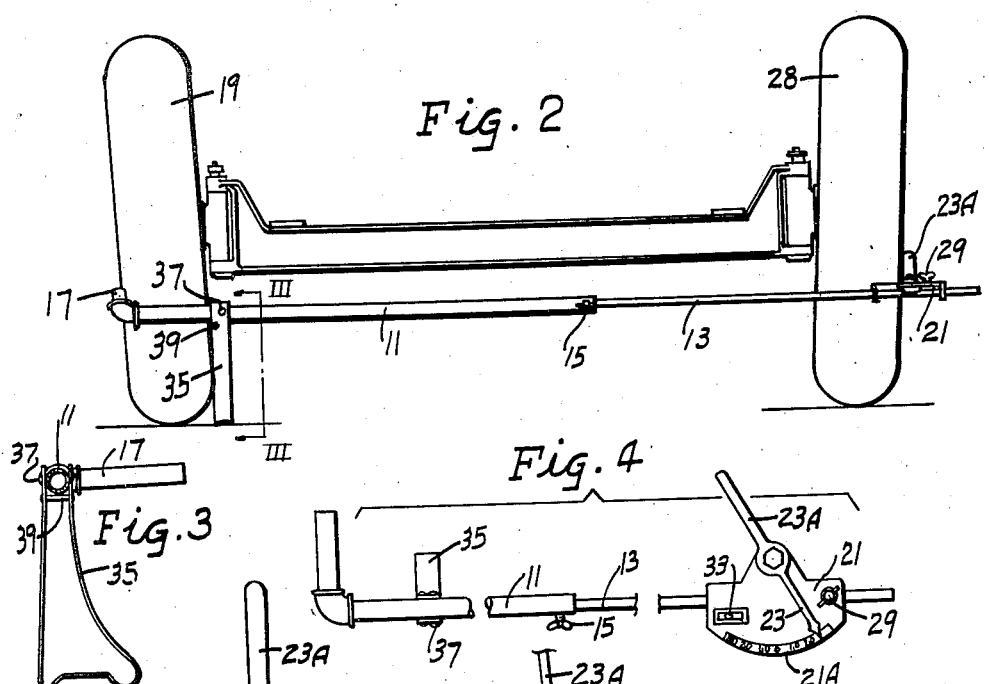
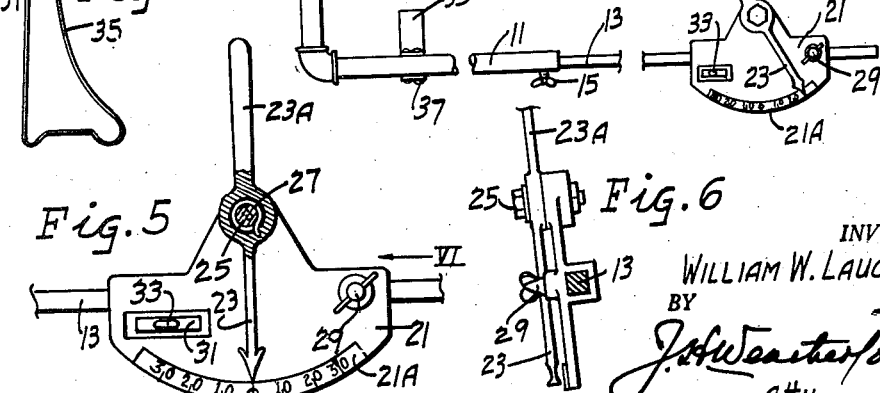
INVENTOR.
WILLIAM W. LAUGHLIN
BY
*J. H. Weatherford*
ATTY.

Patented May 28, 1946

2,401,255

UNITED STATES PATENT OFFICE 2,401,255

COLLAPSIBLE WHEEL ALIGNING GAUGE

William W. Laughlin, Memphis, Tenn.

Application February 2, 1945, Serial No. 575,824

3 Claims. (Cl. 33—203)

This invention relates to wheel aligning gauges, and particularly to a gauge which may be conveniently collapsed for shipping; which may be readily leveled up for contacts at the same height on the opposite wheels, and in which indications of the corrections necessary may be clearly and easily determined.

As is well known, the wheels of an automobile, especially the front wheels, at times get out of alignment causing excess wear on the tires which often causes more damage than many miles of use under correct adjustment.

In making these tests it is of importance that wheel contact parts of the gauge be at the same height on the opposite wheels, that no support for establishing this height be used which will interfere with adjustment of the gauge in making readings and that in lieu thereof a level indicating device be provided which can be conveniently observed during gauge reading. Gauges of this type are necessarily of length to span the wheels, and are inconvenient both for shipping and for storage between uses.

The objects of the present invention primarily are:

To provide a gauge by which the existing wheel alignment may be tested and determined and proper correction made;

To provide a gauge which may be collapsed for convenience in shipping or storing;

To provide a gauge which may be readily contacted with the wheels in testing;

To provide a gauge which may be readily read in making the tests; and

To provide a gauge in which the proper leveling of the gauge bar may be visually determined at the same time that the gauge readings are being made.

The means by which the foregoing and other objects are accomplished, and the method of their accomplishment, will readily be understood from the following specification upon reference to the accompanying drawing, in which:

Fig. 1 is a plan view of the front wheels and axle of an automobile with the gauge contacted with the wheels.

Fig. 2 is a corresponding front elevation.

Fig. 3 is a somewhat enlarged transverse sectional elevation of the gauge on the line III—III of Fig. 2.

Fig. 4 is a plan view of the gauge.

Fig. 5 is an enlarged plan view of the dial and pointer portions of the device; and Fig. 6 a related side elevation looking in the direction of the arrow VI of Fig. 5.

Referring now to the drawing in which the various parts are indicated by numerals:

My device in its preferred form comprises a bar-like member of somewhat greater length than the out to out gauge of the automobile wheels, this member preferably consisting of a tubular bar portion 11 and a telescopic bar portion 13 which are clamped together, as when extended, by a thumb screw 15. The bar portion 13 is of square cross section and is slidably mounted in a socket of similar section within one end portion of said tube, whereby relative turning of said tubular and square portions is prevented, the tubular portion 11 being of length to house the square portion when the gauge is collapsed for shipping or storing.

At its opposite and outer end the tubular portion 11 carries an arm, or arm portion, 17 which extends rigidly therefrom at right angles and is adapted to lie along the outer, or if desired the inner, side of one wheel tire 19.

Slidably mounted on the square bar portion 13 is a dial head 21 on which a cooperative pointer 23 is mounted on a pivot pin 25, this pointer being biased by a spring 27 to point to a central or zero point O on the dial arc 21A. The pointer has an arm portion 23A extending past the pivot pin 25 which is adapted to correspondingly lie along the outer, or inner, side of the opposite wheel tire 28, this arm portion being disposed horizontally in the same plane as the rigid arm portion 17 and being held by the dial head mounting on the square bar portion in such relation. The dial head may be shifted to any desired position along the bar portion 13 and clamped in such position as by a thumb screw 29. 31 is a level tube so mounted in the dial head 21, the usual bubble 33 in the tube, when centrally located, indicating that the bar portions are level, it being particularly noted that the proximity of the dial pointer and the level bubble make it possible to observe both at the same time irrespective of any position shift of the dial member along the bar portion.

Adjacent the fixed arm 17 of the bar portion 11, the bar portion is provided with a bracket 35 adapted to rest on the floor and support that end of the bar and the arm 17, at the desired level relatively to the wheel. The bracket 35 is secured to the bar 11 by a pin 37 on which the bracket hinges relatively to the bar so that when not in use it may fold against the bar. 39 is a second pin carried by the bracket and underlying the bar which limits the swing of the bracket and establishes an upright position therefor.

The pivot pin 37 is so passed through the bar portion 11 that when the bracket is seated on the floor the arm 17, as it extends from the bar 11, will extend upward at a small angle, and the pointer arm 23A at a similar angle.

The device, if conditions permit, is used with the fixed and pointer arms against the outer sides of the wheel tires, as shown in Figs. 1 and 2, such positioning making it possible to push the bar portions 11 and 13 against the threads of the tires and to thus locate and steady the device. Should car parts interfere, however, the arm 17 may be brought against the inside of the tire and the pointer arm 23A be correspondingly so positioned, in which case only the extending bar portion 13 can be brought against the tire tread and the opposite bar portion 11 must be positioned by eye.

In using the device, the automobile is positioned, if possible, on a level floor or other surface. If car parts do not interfere, the readings are preferably taken on the outside of the wheel tires. The device is set up for use by pulling the bar portion 13 out of the bar portion 11 until the bar member is of sufficient length to span from out to out of the wheel tires and the thumb screw 15 tightened to clamp the two bar portions in such extended position. The bracket 35 is turned into supporting position and the device brought into adjacency to the wheel tires with the bracket supporting the outer end of the bar portion 11.

If the reading is to be taken on the outside of the tires and the wheels toe-in, as is usual, the instrument is set by contact with the front portion of the wheel. In doing this, the bar portion 11 is brought against the front of one wheel with the arm 17 contacting the outer side of the wheel and the opposite end of the bar portion 13 swung around into contact with the front of the opposite wheel and the dial head slid along the bar portion 13 until the arm 23A just touches the outer side of that wheel, the bar being raised or lowered as contact is made to bring the level bubble 33 to the center of the tube and insure that the bar member, supported as it is at the opposite end by the bracket 35, is level.

After contact is made by the pointer arm 33A with the side of the tire, with the pointer 23 indicating zero on the dial, the thumb screw 29 is tightened to clamp the dial head in this position. Thereafter the device is moved behind the wheels and brought into similar position and similarly leveled up at the back thereof, the spread of the tires at the back causing displacement of the arm 23 and indicating on the dial arc such displacement, this displacement after allowance is made of the desired toe-in of the wheels indicating the amount of correction necessary. After correction has been made additional check tests may be made.

If car parts interfere the same procedure is followed, except that the arm 17 is brought against the inside of the wheel and the dial head is shifted outward until the pointer arm is contacted with the inside of the wheel tire instead of the outside. Where the device is thus used on the inside of the wheels, it is ordinarily more convenient to use the device first at the back of the wheels so that the dial head may be set and the deflection may be directly read subsequently at the front of the wheels.

It will be understood that the floor, or other surface on which the car wheels rest, may not be exactly level and, therefore, that contact with one wheel may be slightly higher than with the other. Shift of the device from the front to the back of the wheels, however, sets up an identical condition and the readings are relatively not thereby affected.

After the device has been used, if desired, the set screw 15 may be loosened and the bar portion 13 shifted within the bar portion 11 until the dial head comes against the end of the tubular bar portion 11, both the dial head and the bar portion 13 being clamped in such position by their respective thumb screws 15 and 29. The bracket 35 may also be turned or folded against the bar portion 11 and the device is ready for convenient storage, this also being the collapsed condition in which shipment of the device is usually made.

I claim:

1. A collapsible wheel alignment gauge, which includes a tubular bar of substantially less than wheel gauge length, having at one end an arm portion extending rigidly at right angles therefrom and within the opposite end a non-circular sleeve portion, a bar of complementary cross section slidably mounted within said sleeve and constrained from rotation thereby, means for clamping said bars against relative longitudinal shift, a head slidably mounted on said non-circular bar and constrained from rotation thereby, said head including an arm complementary to said fixed arm, means for clamping said head against movement along said bar, and means adjacent said fixed arm end of said tubular bar, for supporting said bar end and constraining said bar portion and the arms extending therefrom against turning movement about the longitudinal axis of said bar.

2. A wheel alignment gauge, which includes bar-like means spanning from out to out of said wheels, means for supporting said bar-like means adjacent one of its ends and for preventing axial rotation of said bar-like means, a fixed arm extending substantially at right angles from said bar-like means adjacent the supported end thereof, gauge means slidably mounted on the opposite end portion of said bar-like means, and means for clamping said gauge means against shift, said means including an arm portion cooperative with said fixed arm, and carrying a level bubble for visually determining when said gauge arm portion is level with said fixed arm.

3. In a wheel gauge, including a bar-like member spanning from out to out of said wheels, a fixed arm at one end of said bar-like member, means supporting said end of said member, and gauge means at the opposite end of said member, said gauge means including a head slidably mounted on said bar-like member, means for clamping said head against shift, a graduated arc carried by said head, a pointer adapted to cooperate with said arc pivotally mounted on said head, said pointer having an arm portion extending beyond said pivot and adapted to cooperate with said fixed arm in making gauge measurements, means biasing said pointer to zero position on said arc, and a level bubble mounted on said head for visually determining when said pointer arm portion is level with said fixed arm

WILLIAM W. LAUGHLIN.